United States Patent [19]

Strohs

[11] 4,295,257
[45] Oct. 20, 1981

[54] WORK STAND FOR VERTICAL TURBINE PUMPS

[76] Inventor: Robert F. Strohs, 8736 Buffalo Dr., Union Lake, Mich. 48085

[21] Appl. No.: 122,990

[22] Filed: Feb. 20, 1980

[51] Int. Cl.$^3$ .............................................. B23P 19/04
[52] U.S. Cl. ....................................... 29/240; 269/43; 29/281.1; 29/281.5
[58] Field of Search ...................... 29/240, 237, 281.1, 29/281.4, 281.5; 81/57.33, 57.39; 269/43, 71, 289 MR, 296

[56] References Cited

U.S. PATENT DOCUMENTS

| | | | |
|---|---|---|---|
| 2,500,204 | 3/1950 | Ronay | 269/289 MR |
| 2,781,930 | 2/1957 | Menser et al. | 269/289 MR X |
| 3,364,555 | 1/1968 | Swink | 29/237 |
| 3,619,158 | 11/1971 | Gogolya et al. | 269/43 X |
| 3,880,029 | 4/1975 | Asada | 81/57.39 X |
| 3,900,938 | 8/1975 | Blomyien et al. | 29/240 |
| 3,926,422 | 12/1975 | Wilson | 269/71 X |
| 4,092,881 | 6/1978 | Jürgens et al. | 29/240 X |

*Primary Examiner*—Robert C. Watson

*Attorney, Agent, or Firm*—Fisher, Gerhardt, Crampton & Groh

[57] ABSTRACT

A work stand specially designed for supporting and aligning the various components of a vertical turbine pump during assembly or disassembly. A plurality of support tables are mounted at longitudinally spaced positions along a stationary bed frame for independent powered vertical adjustment. Roller support cradles are carried by each table to supportingly engage the pump at longitudinally spaced positions to support the various parts of the pump in coaxially aligned relationship with each other. The cradles may be adjusted longitudinally of their tables, and a series of bores spaced longitudinally along the bed frame provide for the mounting of stationary clamp assemblies upon the bed frame between the tables. A powered elevating platform at one end of the bed provides a support for the discharge head of the pump, or alternatively a support, a support cradle, or stationary clamp. Mounting lugs located at longitudinally spaced positions on the bed frame provide a mounting device for mounting a hydraulic cylinder at selected positions longitudinally along the bed frame so that the cylinder can be employed to power a chain wrench operating on various elements of the pump.

8 Claims, 9 Drawing Figures

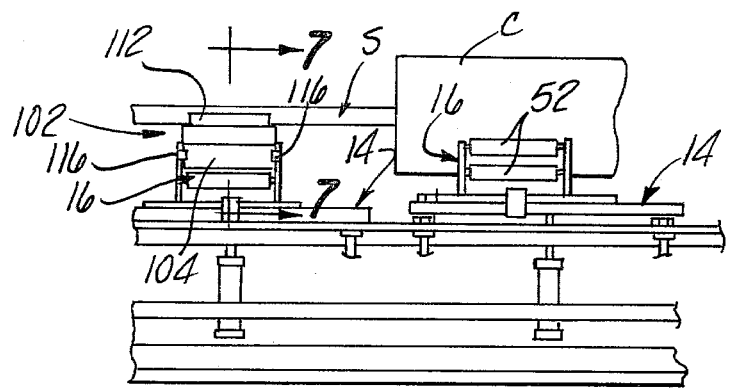
*Fig-6*
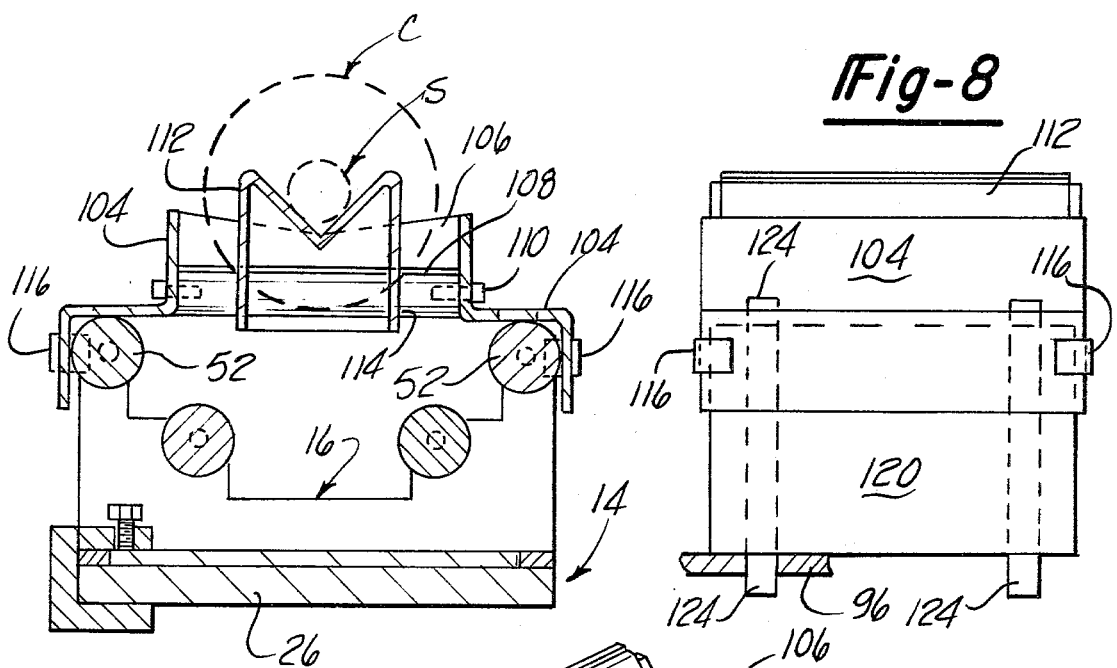
*Fig-8*
*Fig-7*
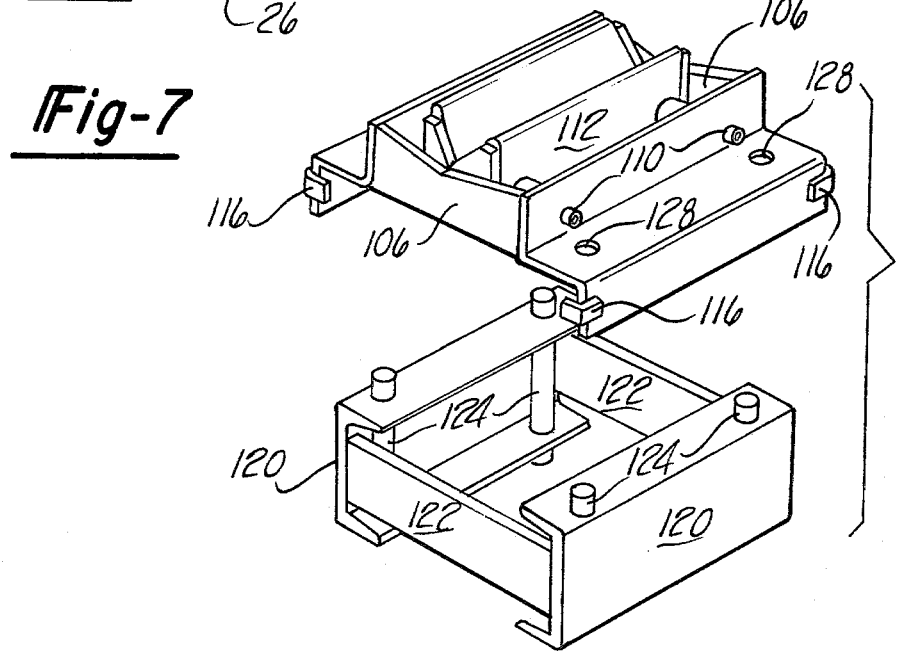
*Fig-9*

WORK STAND FOR VERTICAL TURBINE PUMPS

SUMMARY OF THE INVENTION

Vertical turbine pumps are employed in many industrial and municipal operations to provide for the continuous pumping of relatively large gallonages of fluids. These pumps consist basically of a vertically extending column having an intake, and one or more stages of impellers mounted at the lower end of the column, the impellers being driven by a shaft which extends coaxially upwardly through the column to a drive motor mounted on the top of a discharge head which is mounted on the top of the vertical column. Depending upon the particular application, these pumps are normally of substantial size with typical column lengths of 15 or 20 feet or more, and column diameters ranging up to 3 or more feet. The typical pump is thus made up of several major components, each of which may weigh several hundred pounds.

Such pumps represent a substantial capital investment and, whenever possible, are overhauled or rebuilt. Because of the way in which the pumps are constructed, overhaul and repair of the parts most susceptible to wear, such as the pump impellers, shaft bearings and seals, usually requires a complete disassembly of the pump.

Assembly or disassembly of pumps of this type is complicated by the fact that not only are many of the components extremely bulky and heavy, but further by the fact that precise coaxial alignment of separable parts must be established and maintained during both assembly and disassembly. A drive shaft 20 feet in length which, in operation, will be driven at 1800 rpm or more, obviously must be installed with some degree of precision.

The present invention is especially designed to provide a work stand capable of supporting the various components of pumps of the type described above which is capable of supporting pumps of various dimensions in accurately established and maintained alignment.

SUMMARY OF THE INVENTION

A workstand embodying the present invention includes an elongate horizontal support bed frame. A plurality of support tables are mounted at longitudinally spaced intervals along the bed frame, each table being guided for vertical movement relative to the bed frame and being supported by a vertically acting hydraulic cylinder which may be operated to raise or lower the table to a selected height independently of movement of any of the other tables. Each table carries a roller support cradle mounted upon the table for movement longitudinally of the table to selected positions of adjustment. The pumps which are handled on the table are, with the exception of the discharge head, of circular transverse cross section, and each cradle carries four support rollers mounted for free rotation about parallel longitudinal axis, the rollers forming a cradle which will support the pump for rotation about its longitudinal axis. The bed frame is provided with a series of vertical bores at longitudinally spaced locations which provide for the mounting of stationary clamp assemblies upon the bed frame between adjacent tables so that a component of the pump may be clamped against rotation if desired.

An elevating platform is located at one end of the bed frame to provide a support platform for supporting the discharge head of the pump, or providing an extension of the bed frame.

A series of transversely projecting fixed lugs near the base of the bed frame are bored so that any two pairs of adjacent lugs may receive a rigid rod upon which a hydraulic cylinder is mounted. The cylinder may be employed to power a chain wrench located on a portion of the pump supported on the support cradles.

Other objects and features of the invention will become apparent by reference to the following specification and to the drawings.

IN THE DRAWINGS

FIG. 6 is a detail side view of a portion of the stand of FIG. 1 showing a shaft support assembly;

FIG. 7 is a cross sectional view taken on line 7—7 of FIG. 6;

FIG. 8 is a detail side elevational view of a platform assembly on the machine of FIG. 1, showing a shaft support assembly and an adapter unit; and FIG. 9 is a perspective view of the adapter unit of FIG. 8.

Figure 1:
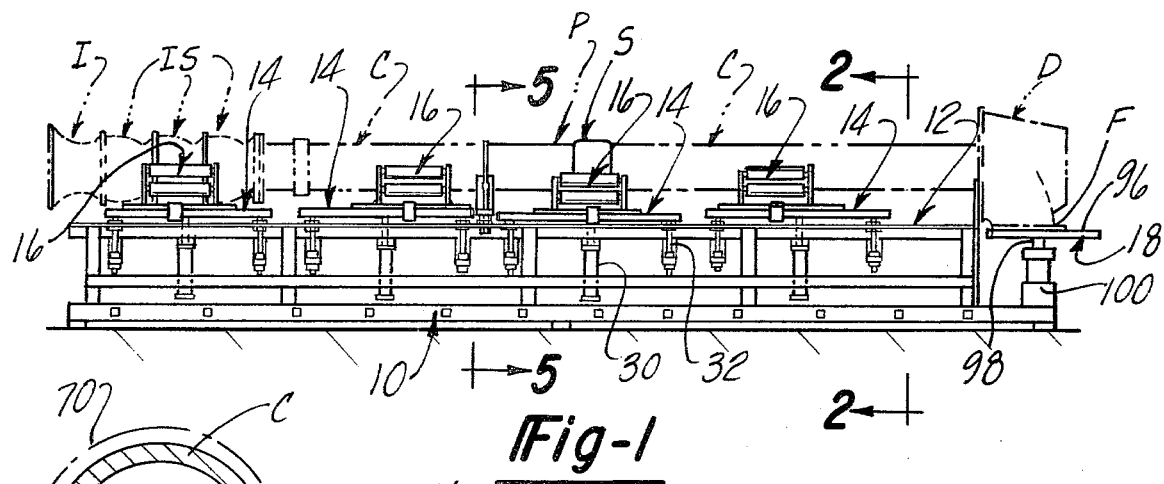
FIG. 1 is a side elevation view of a work stand embodying the present invention.

The overall organization of a work stand embodying the present invention is best seen in FIG. 1. The stand includes a rigid frame, designated generally 10, which rigidly and fixedly supports at a convenient elevation an elongate horizontally extending bed frame designated generally 12. At spaced positions along bed frame 12, a plurality of support tables 14 are mounted for independent vertical movement relative to the stationary bed frame 12. Each support table 14 carries a cradle designated generally 16 which will receive and support elements of a vertical turbine pump shown in line and designated generally P. At one end of bed frame 12, the main frame assembly can support an elevating platform designated generally 18.

The vertical turbine pump P shown in broken line in FIG. 1 shows two column sections designated generally C which, in the particular form of pump illustrated, are interconnected to each other by a threaded sleeve coupling designated generally S. At the lower or left hand end of pump P as viewed in FIG. 1, the pump intake I and, in this case, three impeller stages I S are fixedly mounted at the lower end of the column sections, while a discharge head D is shown at the upper end of the column section (right hand end as viewed in FIG. 1). With the exception of the discharge head D, all of the elements of the pump shown in FIG. 1 are of circular transverse section. The pump P shown in FIG. 1 is a typical vertical turbine pump. Such pumps are manufactured, for example by Worthington Pump Co. of Shawnee, Okla. and are available in a wide variety of sizes and models.

Not illustrated on the pump P shown in FIG. 1 is the pump drive motor which would be mounted on the upper end or right hand side of the discharge head D as viewed in FIG. 1 to drive a drive shaft extending coaxially through the column sections C to the pump impellers located in impeller stages I S.

Figure 2:
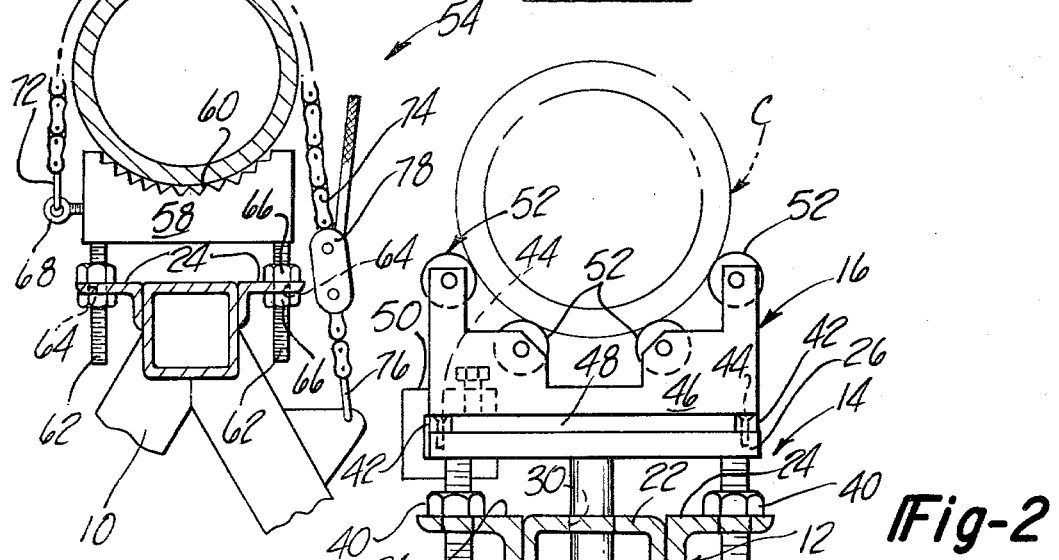
FIG. 2 is a cross sectional view of the work stand of Fugyre 1 taken on line 2—2 of FIG. 1.

Referring to the cross sectional view of FIG. 2, it is seen that the main frame designated generally 10 may include opposed inclined legs 20 which support at their upper end bed frame 12 which is seen to be made up of a central box frame member 22 which supports at either side at its upper end, heavy angle iron frame members 24 which are fixedly secured, as by welding, to the box frame member 22.

Each support table 14 includes a platform 26 in the form of a heavy rectangular plate which is fixedly mounted upon the upper end of the piston rod 28 of a hydraulic cylinder 30. The cylinder of motor 30 is fixedly mounted by means, not shown, in a vertical position on the underside of box frame member 22. The piston rod 28 of motor 30 projects upwardly through suitable bores, such as 30, in frame member 22 so that actuation of cylinder 30 can raise or lower platform 26 relative to bedframe 12. Each motor 30 is provided with its own control valve, not shown, and hydraulically connected to a suitable conventional supply source, likewise not shown. The hydraulic connections for independently controlling and actuating the individual cylinders 30 are completely conventional.

Platform 26 is guided in vertical movement by four vertically extending rods 32 which are fixedly secured at their upper ends to platform 26 to project vertically downwardly from the platform. The rods 32 pass freely through bores, not shown, in angle members 24. The upper portions of rods 34 are threaded, as shown in FIG. 2, while the lower end portions of the rods are smooth surfaced and slidably received for guided movement within axial bearing assemblies designated generally 36 fixedly mounted upon brackets 38 which in turn are fixedly secured, as by welding to box frame 22. Cylinder 30 is normally operable to position platform 26 at a selected height above bed frame 12 with a reasonable degree of accuracy. Where precise positioning of platform 26 is required, nuts 40 threadably received on the threaded sections of rods 32 may be employed to locate and to accurately level platform 26.

As stated above, platform 26 is of rectangular shape when viewed from above, and the rods 32 are located adjacent to each corner of the rectangular platform.

A pair of guide rails 42 are fixedly mounted on and extend along each of the longitudinal sides of platform 26 on its upper surface to provide a guide track for support cradle 16.

Each support cradle 16 includes a pair of vertical end plates 46 which are fixedly secured to and joined together by a rectangular baseplate 48 which is welded to or otherwise fixedly secured to the respective end plates. The width and vertical thickness of baseplate 48 are matched to the spacing between and the height of side rails 42 of platform 26 so that the baseplate is slidably retained between the two side rails which guide the plate in longitudinal sliding movement along platform 26. C-shaped retainers 50 may be employed to hold the support cradle 16 against tipping while accommodating sliding movement of the cradle along guide rails 42.

Four rollers are supported between the cradle end plates 46 for free rotation about parallel axes. As best seen in FIG. 2, the rollers are arranged to support the circular cross sectioned portions of the pump P. In the view of FIG. 2, a column section C of a pump is illustrated as engaging all support rollers, however, usually only either the upper or lower pair of support rollers 52 will engage the pump components, those components of relatively large diameter engaging only the two upper rollers 52 while pump portions of smaller diameter will be supported only by the two lower rollers 52. Because the rollers 52 are freely rotatable about their axes, the supported portions of the pipe may be easily rotated about their central axes.

Figure 5:
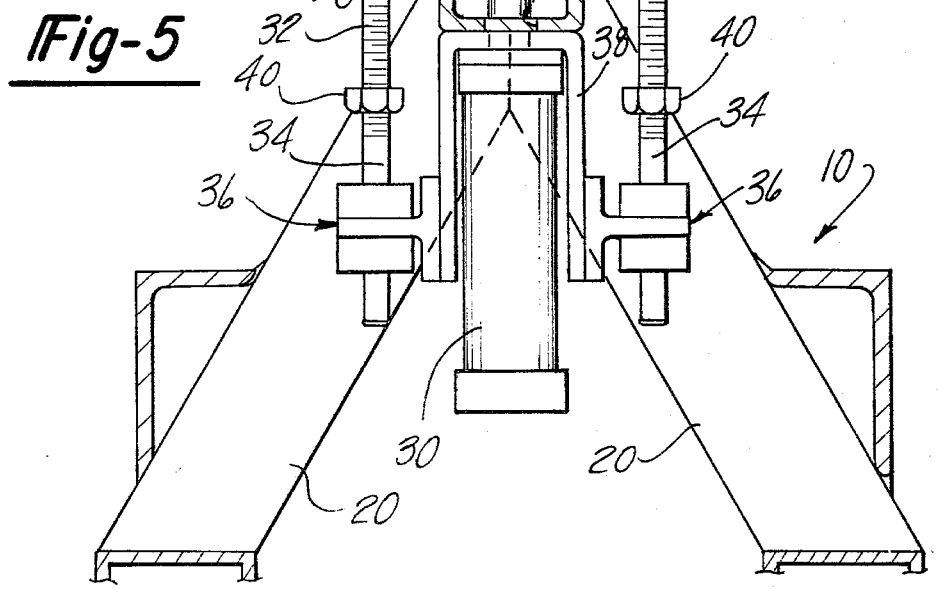
FIG. 5 is a detail cross sectional view taken on line 5—5 of FIG. 1.

To hold a part of the pump P against rotation upon cradles 16, or to anchor the assembly firmly against axial movement, fixed clamp assemblies designated generally 54 (see FIG. 5) may be mounted upon the bed frame between adjacent tables. Clamp assemblies 54 include a jaw 58 having serrated teeth as at 60. A pair of threaded support rods 62 are fixedly secured to the underside of jaw 58 and project downwardly through bores 64 formed in the horizontal flanges of angle irons 24 of the bed frame. The jaw 58 is supported at a selected position of vertical adjustment relative to the bed frame by nuts 66 threadably received upon the threaded rods 62. An eye bolt 68 fixedly secured to jaw 58 provides an anchor for one end of a clamping chain 70 which can be trained over a pump section seated on jaw 58. A hook 72 at the other end of clamping chain 70 can be secured to one end of a length of an ordinary chain whose opposite end is anchored as by a hook 76 fixedly mounted at a suitable location upon the machine frame 10. A chain tightener schematically illustrated at 78 can be employed to tighten the chain 74–70 to firmly clamp the engaged portion of the pump, such as a column section C against the serrated teeth 60 of jaw 58.

Figure 4:
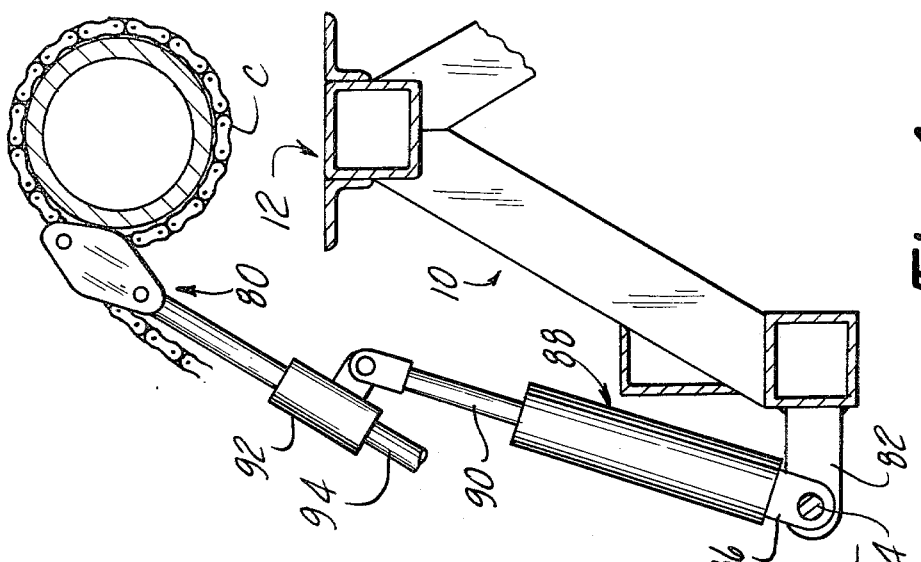
FIG. 4 is a cross sectional view taken on line 4—4 of FIG. 3.
Figure 3:
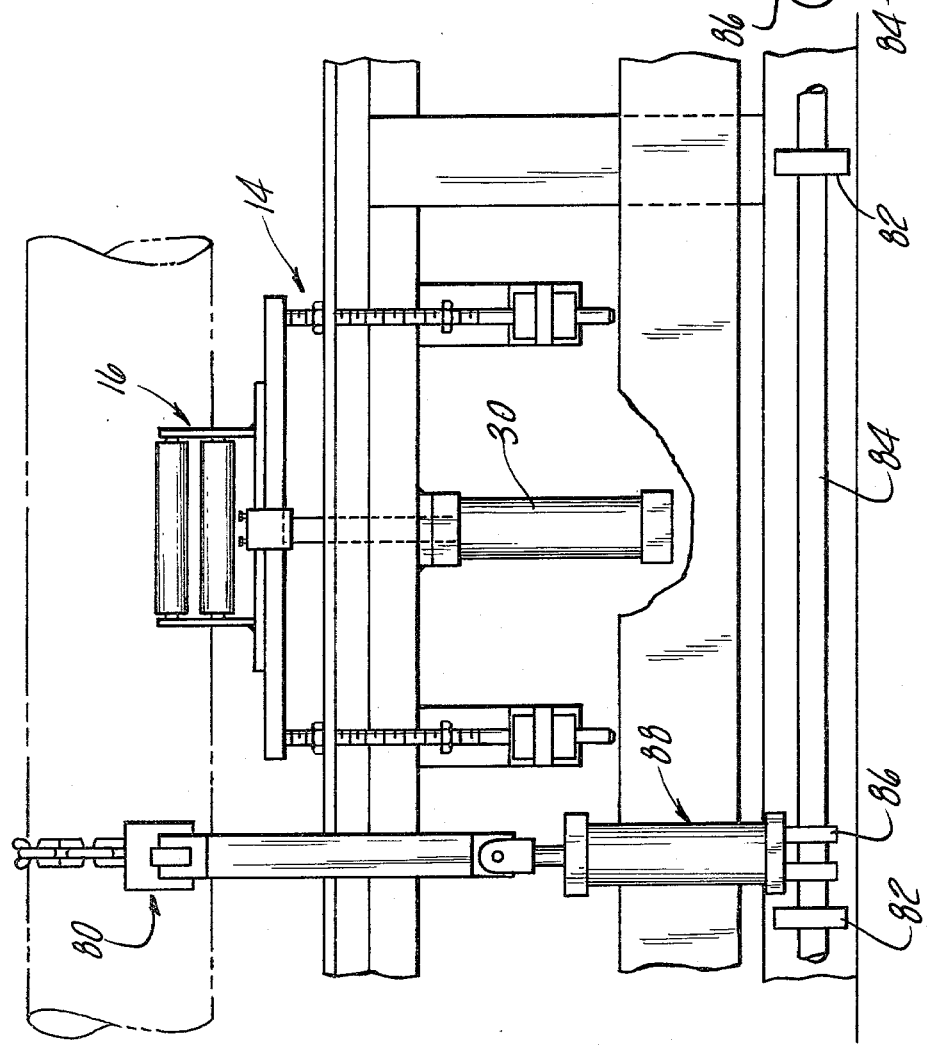
FIG. 3 is a detailed side elevation view of a portion of the work stand of FIG. 1 with certain parts broken away or omitted.

In the event it is necessary to rotate a portion of pump P during assembly or disassembly, such as threading or unthreading a coupling sleeve S from a column section C, a chain wrench designated generally 80 (see FIGS. 3 and 4) is generally employed. While the chain wrench exerts a substantial amount of leverage, relatively large diameter threaded sections of the pump P can present a large area of frictionally engaged threads and it is often difficult, even with the advantage of the leverage present in the chain wrench, to unthread these relatively massive parts by manual effort alone.

To provide for a power operation of the chain wrench at any location along the work stand, a plurality of lugs 82 are welded to the base of frame 10 at longitudinally spaced positions along the frame. The lugs 82 are bored to slidably receive a coupling rod 84 which has a length slightly exceeding the distance between two adjacent lugs. The coupling rod can slidably receive the clevis 86 of a fluid cylinder designated generally 88 so that the motor can be mounted at any desired location along the frame of the machine. An extension rod 90 is pivotally coupled at one end to the piston rod of cylinder 88 and is pivotally coupled at its opposite end to a relatively short section of pipe 92 which can be slipped onto the operating handle 94 of the chain wrench 80. Motor 88 is suitably coupled by flexible hoses, not shown, to the supply lines, not shown, which supply operating pressure to the various table operating cylinders 30. Inasmuch as the various hydraulic connections are completely conventional, they have not been shown in the drawing.

Referring now to FIG. 1, an elevating platform designated generally 18 is located at one end of bed frame 12. The platform 18 consists simply of a flat rectangular platform or table 96 which is mounted upon the piston rod 98 of a vertically disposed hydraulic cylinder 100 whose cylinder is fixedly mounted upon main frame 10. Cylinder 100 is connected in a conventional manner to a pressure supply source, not shown, and is provided with its own control valve, not shown, so that cylinder 100 may be actuated independently of the other hydraulic motors of the system. As indicated in FIG. 1, platform 18 may be employed to support the discharge head D of a pump by providing a flat surface for receiving and supporting the coupling flange F of the discharge port of head D. The platform may also be used to mount a shaft support assembly to be described below.

Referring now particularly to FIG. 6, the pump as described above, employs a concentrically mounted drive shaft which, during assembly and disassembly, requires a precisely located support. To provide such a support for the shaft, a shaft support assembly designated generally 102 is made up of a pair of longitudinally extending side members 104 of Z shaped cross section which are rigidly interconnected to each other in spaced parallel relationship by a pair of end plates 106 (see FIGS. 6 and 7) welded to side members 102 at each end. A pair of transversely extending support rods 108 are fixedly secured as by bolts 110 to extend between side members 104 to provide a mounting support for a M shaped cross section, shaft member 112, the legs of member 112 being bored as at 114 to slidably mount member 112 on the two support rods 108. At each end of each side member 104, L shaped locating tabs 116 are welded to side members 104. As best seen in FIG. 7 the spacing between the lower flanges of side members 104 is selected so that they may rest upon the two upper rollers 52 of a support cradle 16, the L shaped tabs 116 projecting inwardly to engage the opposite axial ends of the support rollers so that the shaft support assembly, when mounted upon a support cradle 16 is held against longitudinal and transverse movement relative to the support cradle. As best seen in FIG. 7, the M shaped cross section support member 112 can be vertically positioned to receive and support a shaft S.

To enable the mounting of a shaft support assembly 102 upon elevating platform 26, an adaptor assembly 118 (see FIGS. 8 and 9) is provided. The adaptor assembly includes a pair of side members 120 of C shaped channel cross section joined into spaced parallel relationship with each other by a pair of end members 122 welded to members 120. A pair of vertically extending rod members 124 project through the upper and lower flanges of side members 120 and are fixedly welded to the side members. Platform 96 is provided with four bores as at 126 located to receive the downwardly projecting portions of rods 124, while similar bores as at 128 in side members 104 of shaft assembly 102 slidably receive the upper ends of rods 124 so that the adaptor member 118 and shaft support member 102 may be accurately located upon platform 96.

While one embodiment of the invention has been described in detail, it will be apparent to those skilled in the art that the disclosed embodiment may be modified, therefore, the foregoing description is to be considered exemplary rather than limiting, and a true scope of the invention is that to file the following claims.

I claim:

1. A workstand for supporting and aligning components of a vertical turbine pump during assembly or disassembly comprising an elongate horizontally extending bed frame, a plurality of support cradles mounted at longitudinally spaced positions on said bed frame, each of said cradles comprising a cradle frame and at least a pair of support rollers mounted for free rotation on said cradle frame about spaced parallel horizontal axes extending longitudinally of said bed frame and symetrically disposed on opposite sides of a common vertical plane extending longitudnally of said bed frame, said rollers being operable to supportingly engage cylindrical positions of components of a vertical turbine pump to maintain said components in alignment with each other with the axis of said components lying in said vertical plane, means for independently vertically positioning each of said cradle frames relative to said bed frame, means for independently longitudinally positioning each of said cradle frames relative to said bed frame, and a shaft support assembly for supporting a shaft projecting coaxially from a pump component supported on at least one of said cradles, said shaft support assembly comprising lower frame means adapted to be seated upon the support rollers of one of said cradles, and upper frame means having a longitudinally extending shaft receiving notch of V shaped transverse cross section.

2. A work stand as defined in claim 1 further comprising means mounting said cradle upon said table for guided movement on said table longitudinally of said frame member, and means for locking said cradle upon said table at a selected position of longitudinal adjustment.

3. A work stand as defined in claim 1 wherein said tables are mounted upon said bed frame in uniformly longitudinally spaced relationship with each other, clamping jaw means, and means on said bed frame for fixedly mounting said clamping jaw means upon said bed frame between two adjacent tables.

4. A work stand as defined in claim 1 further comprising clamp means mounted upon said bed frame adjacent one of said tables for clamping a first portion of a turbine pump supported upon said work stand against rotation, and power means mounted upon said work stand operable to assist in rotating a second portion of a turbine pump supported on the cradle of said one of said tables.

5. A work stand as defined in claim 4 wherein said power means comprises a hydraulic cylinder having a clevis fixedly mounted at the base thereof, a plurality of lugs fixedly mounted at longitudinally spaced locations on said bed frame and having longitudinally aligned rod receiving bores therethrough, and a rod slidably receivable in said bores and said clevis for detachably mounting said cylinder on said bed frame at selected positions longitudinally of said bed frame.

6. A workstand as defined in claim 1 further comprising a platform mounted at one end of said bed frame for vertical movement relative to said bed frame, power means for driving said platform in vertical movement, and means for detachably mounting a work support upon said platform.

7. A workstand as defined in claim 1 wherein said bed frame comprises means defining a horizontal web having uniformly spaced vertical bores therethrough located on said bed frame between adjacent tables, and clamp means having vertically extending posts thereon slidably receivable in said bores for locating and mounting said clamp means on said bed frame.

8. The invention defined in claim 1 wherein said lower frame means comprises a pair of opposed side frame members each having a longitudinally extending horizontal web adapted to rest upon a support roller and a longitudinally extending vertical web projecting downwardly from the outer edge of the horizontal web to engage the side of a support roller.

* * * * *